United States Patent [19]
Kouhei et al.

[11] Patent Number: 5,926,347
[45] Date of Patent: Jul. 20, 1999

[54] MAGNETIC DISK DRIVE PROVIDED WITH MEANS FOR PRESSING HEAD AGAINST DISK

[75] Inventors: Tohru Kouhei; Tomoyoshi Yamada; Yasumasa Kuroba, all of Kawasaki, Japan

[73] Assignee: Fujitsu Limited, Kawasaki, Japan

[21] Appl. No.: 08/921,880

[22] Filed: Sep. 2, 1997

Related U.S. Application Data

[63] Continuation of application No. 08/423,525, Apr. 17, 1995, abandoned.

[51] Int. Cl.$^6$ ...................................................... G11B 5/54
[52] U.S. Cl. ........................................ 360/105; 360/97.01
[58] Field of Search ................................. 360/105, 106, 360/75, 78.05, 97.01, 103; 369/75.2, 71, 72, 247

[56] References Cited

U.S. PATENT DOCUMENTS

| | | | |
|---|---|---|---|
| 4,484,241 | 11/1984 | Brende et al. | 360/105 |
| 5,189,575 | 2/1993 | Onooka et al. | 360/105 |
| 5,239,431 | 8/1993 | Day et al. | 360/105 X |
| 5,305,170 | 4/1994 | Dion | 360/105 |
| 5,453,891 | 9/1995 | Takemoto | 360/106 X |
| 5,557,589 | 9/1996 | Mukawa et al. | 369/13 |
| 5,590,006 | 12/1996 | Shafe | 360/105 |

FOREIGN PATENT DOCUMENTS

| | | |
|---|---|---|
| 453109 | 10/1991 | European Pat. Off. . |
| 59-48867 | 3/1984 | Japan . |
| 60-076069 | 4/1985 | Japan . |
| 61-153869 | 7/1986 | Japan . |
| 62-22267 | 1/1987 | Japan . |
| 62-231462 | 10/1987 | Japan . |
| 3-122879 | 5/1991 | Japan . |
| 4-341983 | 11/1992 | Japan . |

*Primary Examiner*—Andrew L. Sniezek
*Attorney, Agent, or Firm*—Greer, Burns & Crain Ltd.

[57] ABSTRACT

A magnetic disk apparatus includes a magnetic disk accommodated for rotation in a housing, a spindle mechanism for driving the magnetic disk to rotate, a magnetic head for writing and reading out information onto and from the magnetic disk, a suspension for supporting the magnetic head thereon, an actuator for driving the suspension in order to move the magnetic head in a radial direction of the magnetic disk, and a retraction mechanism for retracting the magnetic head to a particular area on the magnetic disk when the spindle mechanism is rendered inoperative. The magnetic disk apparatus further includes a mechanism provided at a location above the magnetic disk in an opposing relationship to the particular area of the magnetic disk for pressing at least one of the magnetic head and the suspension against the magnetic disk. In lieu of the pressing mechanism, a displacement restriction member may be provided.

8 Claims, 10 Drawing Sheets

MAGNETIC DISK DRIVE PROVIDED WITH MEANS FOR PRESSING HEAD AGAINST DISK

This application is a continuation of application Ser. No. 08/423,525 filed on Apr. 17, 1995 now abandoned.

BACKGROUND OF THE INVENTION

1. Field of the Invention

This invention relates to a magnetic disk apparatus or magnetic disk drive provided with a mechanism which can protect a head and a disk from an impact when the apparatus drops or in a like case.

2. Description of the Related Art

In recent years, magnetic disk apparatus which are used as external storage apparatus for computers or like apparatus have increased recording density and reduced size and thickness. As the size and thickness of the magnetic disk apparatus is reduced, a portable magnetic disk apparatus has been developed which can be inserted into an IC card slot when it is to be used. When a portable magnetic disk apparatus is carried, it may possibly be acted upon by an impact as it dropped or the like. Since the acceleration by impact upon dropping amounts to several thousands G, a magnetic disk apparatus is required to have a high degree of reliability that, even when dropped, a head slider, a disk medium or any other element in the magnetic disk apparatus is not be damaged.

Figure 10:
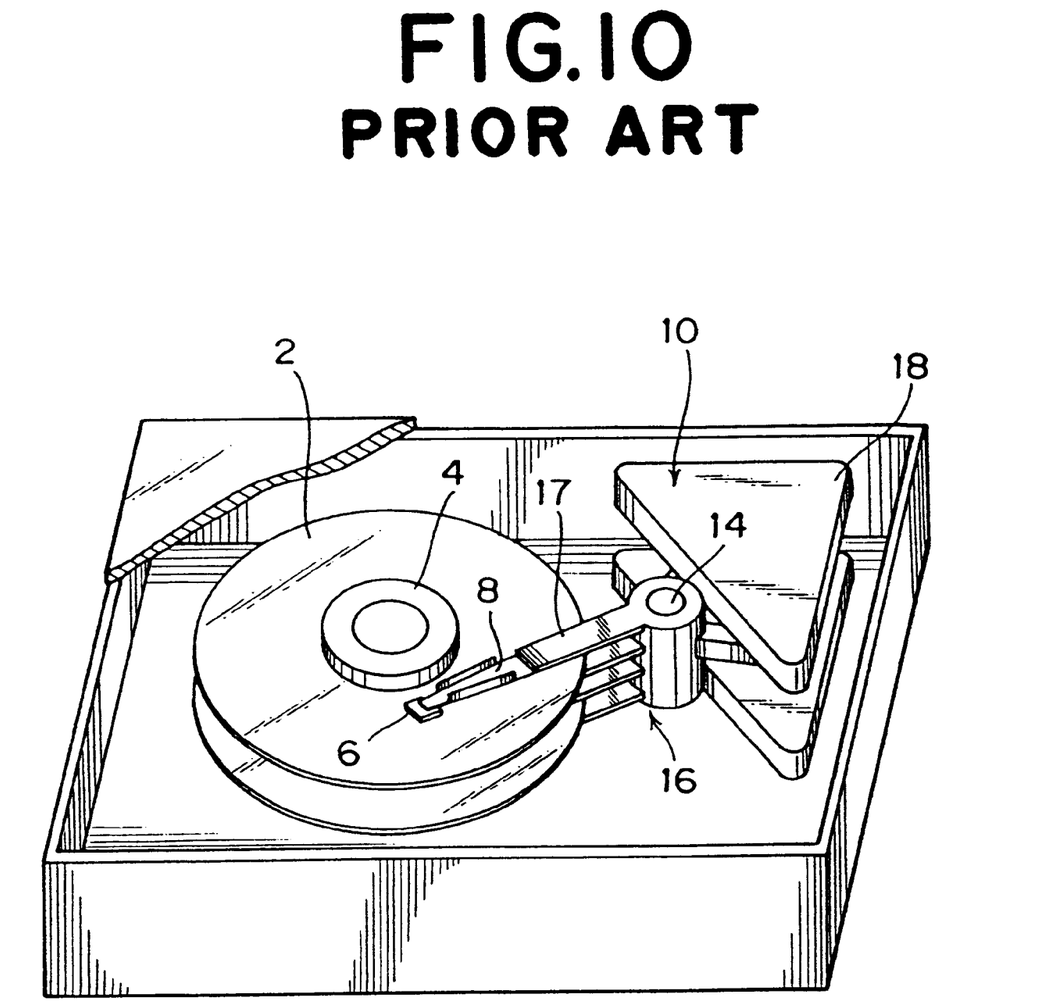
FIG. 10 is a perspective view, partly broken, of a conventional magnetic disk apparatus.

FIG. 10 is a perspective view, partly broken, of a conventional magnetic disk apparatus. The apparatus shown includes a pair of magnetic disk mediums 2, a spindle mechanism 4 for rotating the magnetic disk mediums 2, four head sliders 6 provided in an opposing relationship to the magnetic disk mediums 2 and each carrying thereon a magnetic head for writing and reading out information onto and from the opposing magnetic disk medium 2, a head suspension mechanism 8 for supporting each of the head slider 6, and an actuator 10 for actuating the head suspension mechanisms 8 to cause the magnetic heads to perform a seeking operation in a radial direction of the magnetic disk media 2.

The head suspension mechanism 8 includes a load beam and a gimbal. The actuator 10 includes an actuator arm assembly 16 mounted for rotation around a shaft 14 and having a plurality of (four) arms 17 on which the load beams of the head suspension mechanisms 8 are mounted, and a driving section (voice coil motor) 18 for driving the actuator arm assembly 16 to rotate.

Some of magnetic disk apparatus of the type just described include a loading/unloading mechanism (not shown). The loading/unloading mechanism extracts, when the power supply is disconnected, energy from inertial rotation of the spindle mechanism 4 as a back electromotive force of a spindle motor and flows an electric current through the voice coil motor of the actuator 10 to energize the actuator 10 so that the head suspension mechanisms 8 run on tapered run-on members provided on the cover or the like to lift the head sliders 6 from the magnetic disk media 2 to perform unloading. On the other hand, upon loading, the power supply is connected to energize the actuator 10 to move the head sliders 6 to stand-by tracks (also called zero cylinders) on the magnetic disk media 2.

Where the loading/unloading mechanism described above is employed, even if the head sliders are lifted and retracted upon unloading, when the head sliders are spaced away from the magnetic disk media or are loaded onto the magnetic disk media again, the head sliders move in an unstable manner, whereupon an edge of a head slider sometimes comes in contact with the opposing magnetic disk medium to causing a head crash.

Further, due to the fact that the rigidity of the head suspension mechanism or the loading/unloading mechanism is low, if an impact acts upon the apparatus due to its being dropped or the like, even after unloading has been performed, a head slider may collide with the magnetic disk medium to cause damage to the head slider or the magnetic disk medium. The loading/unloading mechanism provides further problems peculiar thereto such as the sufficiency of back electromotive force of the spindle motor, which is used as an energy source upon unloading, cannot be assured due to a drop in inertia of the rotating section and a drop in efficiency of the spindle motor as a result of reduction in size of the apparatus.

SUMMARY OF THE INVENTION

Accordingly, it is an object of the present invention to provide a magnetic disk apparatus by which a magnetic head (or a head slider) and a magnetic disk medium can be protected from an impact upon dropping of the apparatus or the like without using a loading/unloading mechanism.

In accordance with an aspect of the present invention, there is provided a magnetic disk apparatus, comprising a housing; a magnetic disk medium accommodated for rotation in the housing; spindle means for driving the magnetic disk medium to rotate; a magnetic head for writing and reading out information onto and from the magnetic disk medium; head suspension means for supporting the magnetic head thereon; actuator means for driving the head suspension means to move the magnetic head in a radial direction of the magnetic disk medium; retraction means for retracting the magnetic head to a particular area on the magnetic disk medium when the spindle means is rendered inoperative; and means provided at a location above the magnetic disk medium in an opposing relationship to the particular area of the magnetic disk medium for pressing at least one of the magnetic head and the head suspension means against the magnetic disk medium.

Since the pressing means is provided at the location above the magnetic disk medium in an opposing relationship to the particular area of the magnetic disk medium, the magnetic head can be prevented from being spaced away from the face of the magnetic disk medium by the pressing means when the magnetic disk medium is in a stopping condition.

In accordance with another aspect of the present invention, there is provided a magnetic disk apparatus, comprising a housing; a magnetic disk medium accommodated for rotation in the housing; spindle means for driving the magnetic disk medium to rotate; a magnetic head for writing and reading out information onto and from the magnetic disk medium; head suspension means for supporting the magnetic head thereon; actuator means for driving the head suspension means to move the magnetic head in a radial direction of the magnetic disk medium; retraction means for retracting the magnetic head to a particular area on the magnetic disk medium when the spindle means is rendered inoperative; means provided at a location above said magnetic disk medium for pressing at least one of said magnetic head and said head suspension means against said magnetic disk medium; and displacement restriction means provided at a location above the magnetic disk medium in an opposing relationship to the particular area of the magnetic disk medium with a small gap left from at least one of the magnetic head and the head suspension means.

In accordance with a further aspect of the present invention, there is provided a magnetic disk apparatus, comprising a housing; a magnetic disk medium accommodated for rotation in the housing; spindle means for driving the magnetic disk medium to rotate; a magnetic head for writing and reading out information onto and from the magnetic disk medium; head suspension means for supporting the magnetic head thereon; actuator means for driving the head suspension means to move the magnetic head in a radial direction of the magnetic disk medium; retraction means for retracting the magnetic head to a particular area on the magnetic disk medium when the spindle means is rendered inoperative; an arresting member secured to the head suspension means around a position at which the magnetic head is mounted on the head suspension means; and a displacement restriction member provided at a location above the magnetic disk medium in an opposing relationship to the particular area of the magnetic disk medium, the displacement restriction member being made of a material which is flexible in a direction in a plane of a seeking direction of the magnetic head but is rigid in a direction perpendicular to the plane; wherein the displacement restriction member and the arresting member contact, when the magnetic disk medium stops rotation, with each other to prevent the magnetic head from moving away from a face of the magnetic disk medium.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1A:
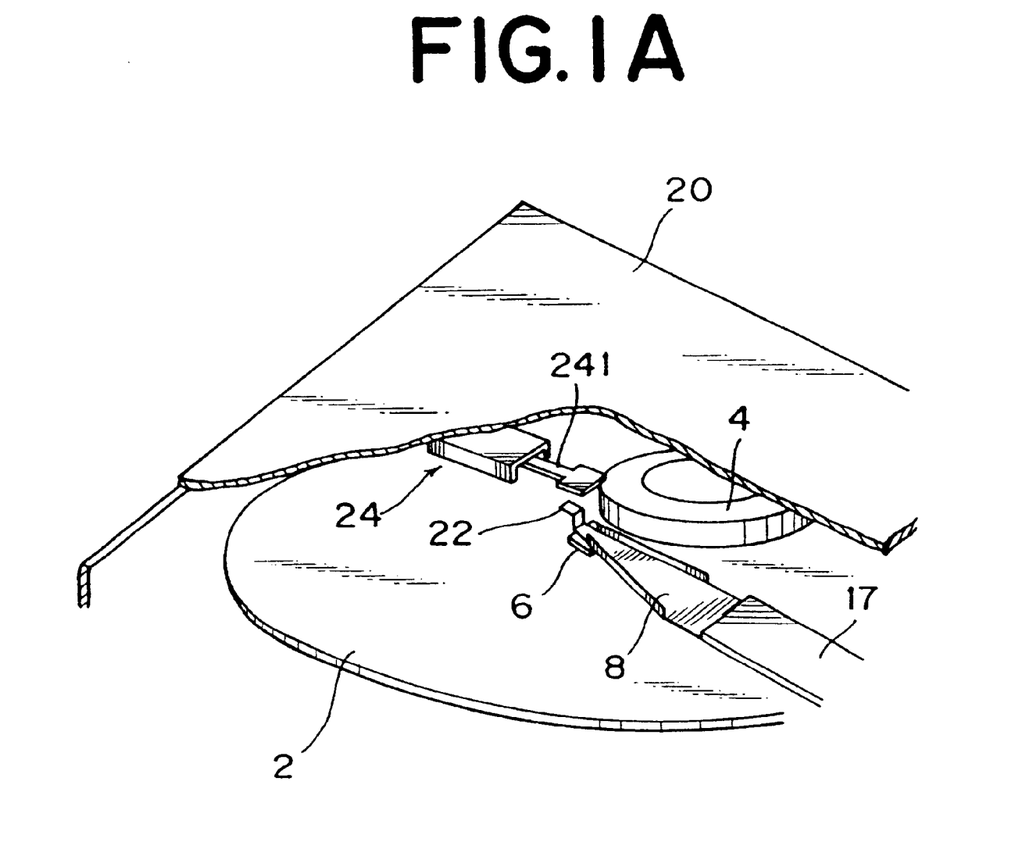
FIG. 1A is a perspective view, partly broken, of a magnetic disk apparatus of a first embodiment of the present invention.
Figure 1B:
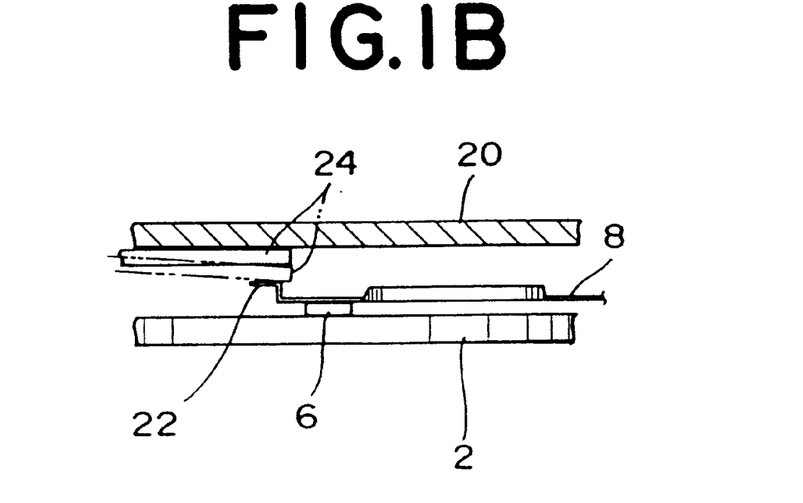
FIG. 1B is a side elevational view, partly in section, of the magnetic disk apparatus of FIG. 1A.

FIGS. 1A and 1B show a first embodiment of the present invention, and FIG. 1A is a perspective view, partly broken, of a magnetic disk apparatus and FIG. 1B is a side elevational view, partly in section, of the apparatus of FIG. 1A. Substantially like elements are denoted by like reference numerals through all of the figures.

In the present embodiment, a magnetic disk medium 2, a spindle mechanism 4 and other parts are accommodated in a housing 20. In order to press at least one of a head slider 6 and a head suspension mechanism 8 (in the present embodiment, the head suspension mechanism 8) against the magnetic disk medium 2 when the power supply to the apparatus is off and the magnetic disk medium 2 is in a stopping condition, an L-shaped metal member 22 is provided at an end of a load beam of the head suspension mechanism 8 and a load mechanism 24 is provided at a location in the inside of the cover 20 of the housing in an opposing relationship to a contact start/stop area (CSS area) on the inner side of the magnetic disk medium 2. The load mechanism 24 includes a leaf spring 241 and an electromagnet (not shown). The electromagnet is constructed such that, when the disk medium stops, the electromagnet is de-energized to cancel its attracting force to the leaf spring 241.

Subsequently, operation of the apparatus after the power supply to the apparatus is disconnected will be described. After the power supply is disconnected and the control of the actuator is interrupted, the head slider 6 is retracted to a location on a particular area (for example, the CSS area) on the inner side of the magnetic disk medium 2 by a known automatic retraction mechanism. After the spindle mechanism 4 which has been rotated by a force of inertia stops, the electromagnet of the load mechanism 24 is put into a de-energized condition to cancel its attracting force to the leaf spring 241 so that the leaf spring 241 is moved down to press the L-shaped metal member 22 provided at the end of the gimbal of the head suspension mechanism 8 against the magnetic disk medium 2.

Here, it is assumed that the components of the apparatus are acted upon by an acceleration in a direction perpendicular to the magnetic disk medium 2 by an impact produced when the apparatus drops. When the mass of the head slider 6 and the head suspension mechanism 8 is represented by mH and the acceleration acting upon them is a, the members are acted upon by a force of inertia of mH×a=FH. If the force FP exerted from the load mechanism 24 is higher than the inertial force FH, that is, if FH<FP, then the head slider 6 is kept pressed against the magnetic disk medium 2 and they will not be spaced away from each other. Consequently, the head slider 6 and the magnetic disk medium 2 are prevented from being damaged. While, in the present embodiment, a load is applied to part of the head suspension mechanism 8, the apparatus may be modified such that a load is applied to the head slider 6 itself.

Figure 2A:
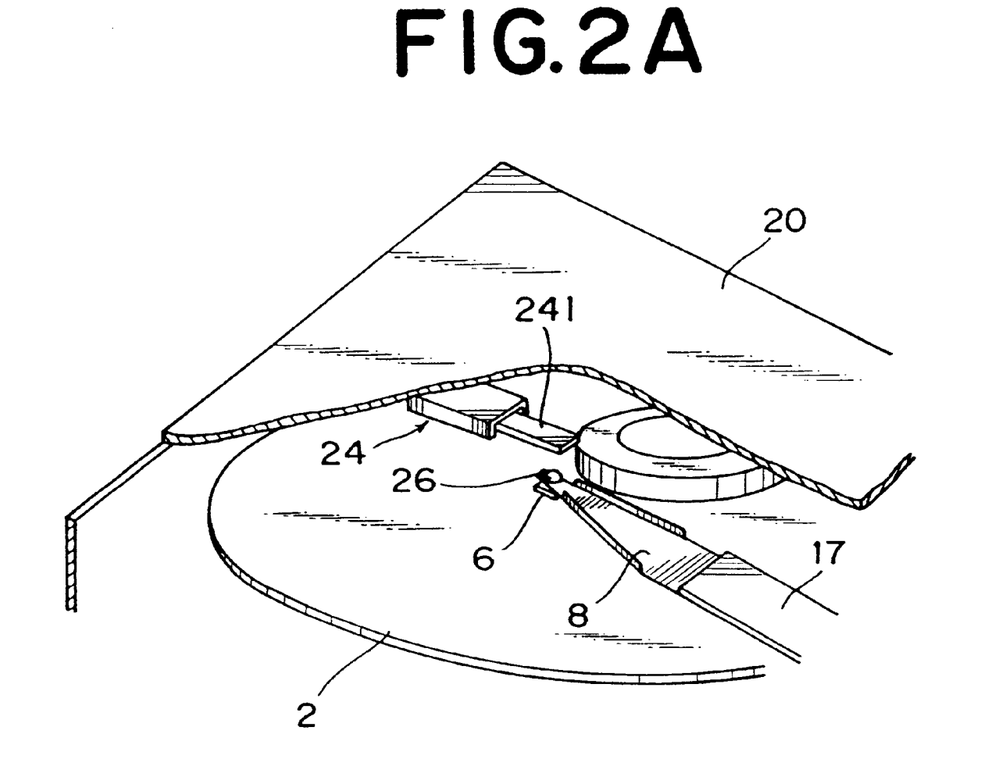
FIG. 2A is a perspective view, partly broken, of a magnetic disk apparatus of a second embodiment of the present invention.
Figure 2B:
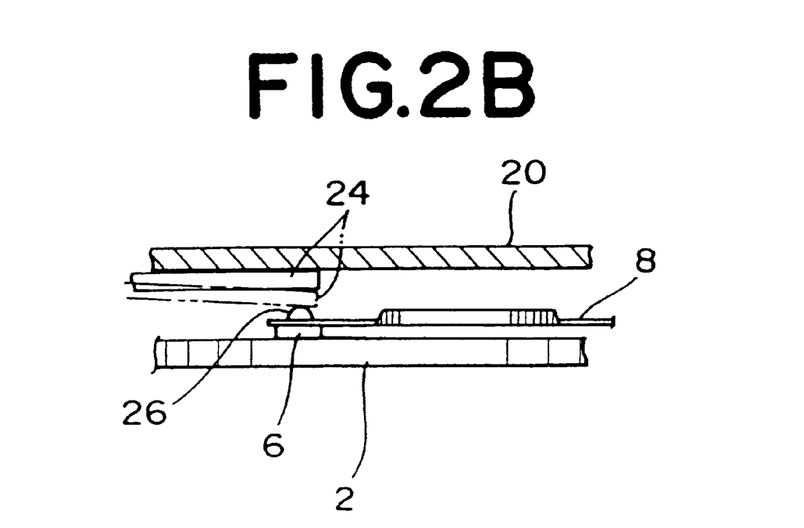
FIG. 2B is a side elevational view, partly in section, of the magnetic disk apparatus of FIG. 2A.

FIGS. 2A and 2B show a second embodiment of the present invention, and FIG. 2A is a perspective view, partly broken, of a magnetic disk apparatus and FIG. 2B is a side elevational view, partly in section, of the magnetic disk apparatus of FIG. 2A. In the present embodiment, in order for the load mechanism 24 to press the head suspension mechanism 8 against the magnetic disk medium 2, the L-shaped metal member in the first embodiment of FIGS. 1A and 1B is replaced by a projection 26 provided at a location of the load beam of the head suspension mechanism 8 (in a mechanism wherein a gimbal is formed integrally at the end of a load beam, at a location of the gimbal) corresponding substantially to a central portion of the head slider 6. With the construction just described, when the power supply is disconnected, a load can be applied to a location nearer to the center of the head slider 6 by the load mechanism 24, and consequently, the effect in suppressing the relative displacement of the head slider 6 is enhanced.

Figure 3A:
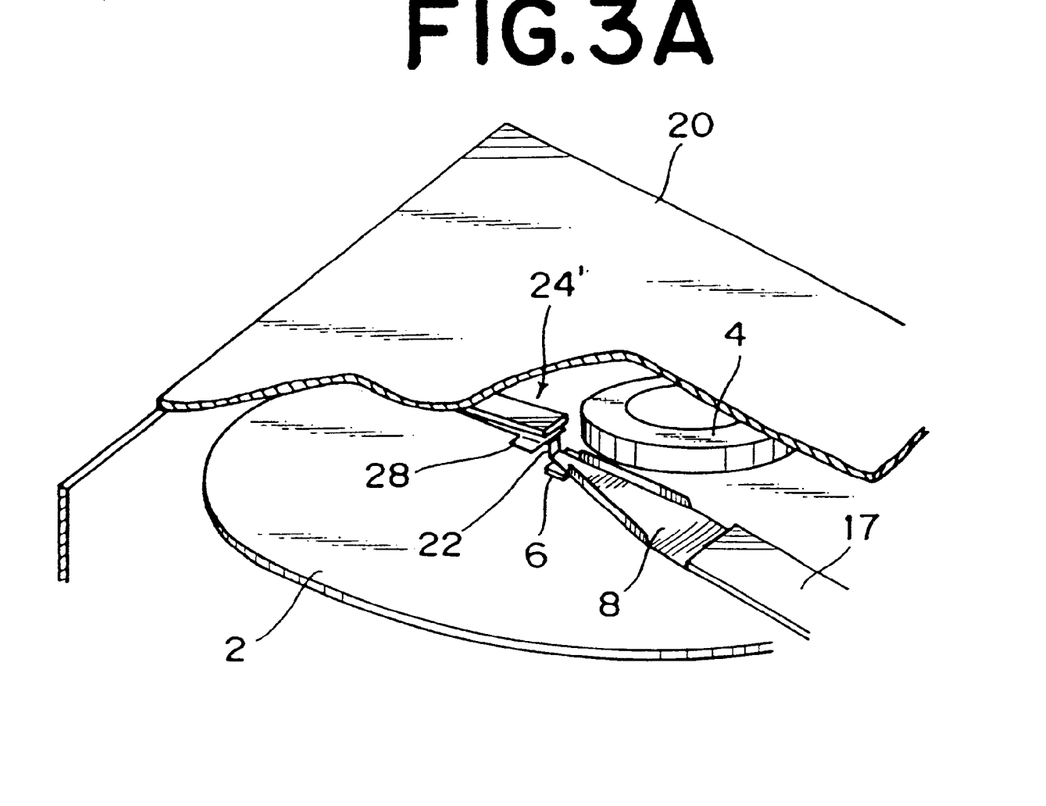
FIG. 3A is a perspective view, partly broken, of a magnetic disk apparatus of a third embodiment of the present invention.
Figure 3B:
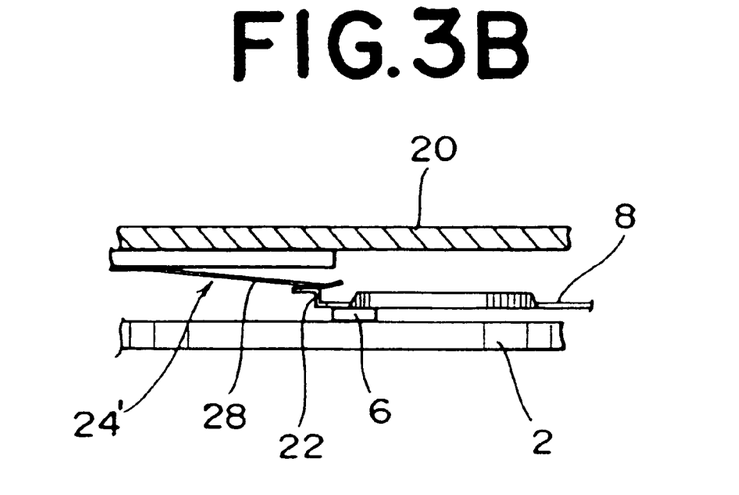
FIG. 3B is a side elevational view, partly in section, of the magnetic disk apparatus of FIG. 3A.

FIGS. 3A and 3B show a third embodiment of the present invention, and FIG. 3A is a perspective view, partly broken, of a magnetic disk apparatus and FIG. 3B is a side elevational view, partly in section, of the magnetic disk apparatus of FIG. 3A. In the present embodiment, the load mechanism 24 which is positively driven by a power source (an electromagnet, a piezoelectric element, a heater or the like) in the first embodiment of FIGS. 1A and 1B is replaced by a load mechanism 24' which is provided on the inner side of the cover 20 and does not require a power source. The magnetic disk apparatus of the present embodiment is similar to the magnetic disk apparatus of the first embodiment of FIGS. 1A and 1B in that an L-shaped metal member 22 is provided at the end of the load beam of the head suspension mechanism 8. The load mechanism 24' includes a leaf spring 28 having a comparatively low spring constant in order to press the head slider 6 against the magnetic disk medium 2 by way of the L-shaped metal member 22 and the head suspension mechanism 8.

When the power supply is disconnected and the control of the actuator is interrupted, the head slider 6 is moved to the CSS area on the inner side of the magnetic disk medium 2 by the automatic retraction mechanism. In this instance, the L-shaped metal member 22 mounted at the end of the load beam of the head suspension mechanism 8 enters below the load mechanism 24' and is contacted with the bottom face of the leaf spring 28. Then, the head slider 6 is pressed against the magnetic disk medium 2 by the spring force of the leaf spring 28. With the magnetic disk apparatus of the present embodiment, since the power source is not required for the load mechanism, the apparatus is simplified in construction.

Figure 4A:
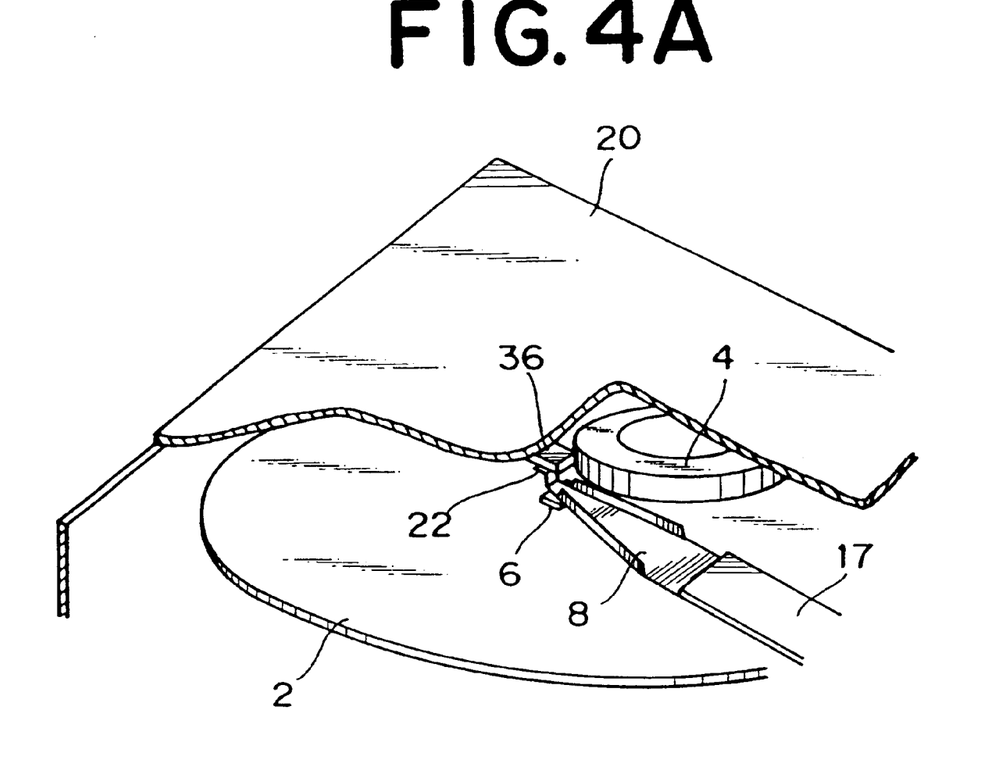
FIG. 4A is a perspective view, partly broken, of a magnetic disk apparatus of a fourth embodiment of the present invention.
Figure 4B:
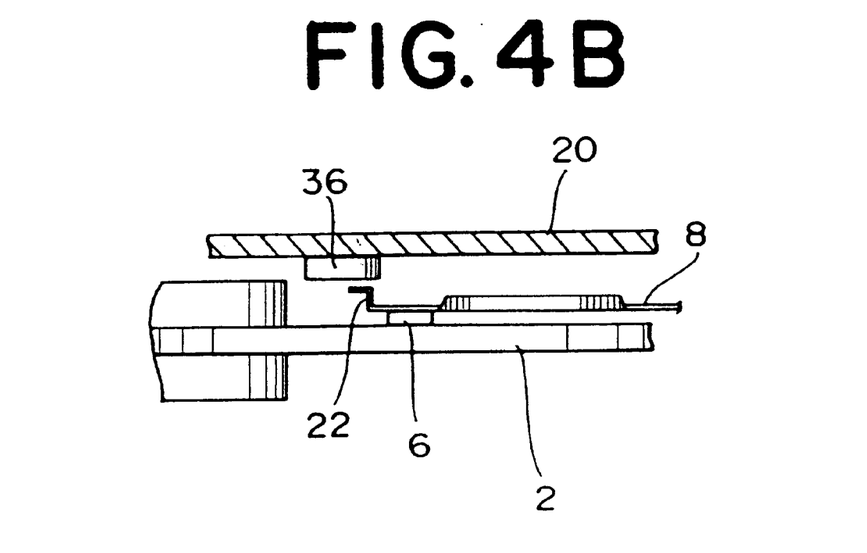
FIG. 4B is a side elevational view, partly in section, of the magnetic disk apparatus of FIG. 4A.

FIGS. 4A and 4B show a fourth embodiment of the present invention, and FIG. 4A is a perspective view, partly broken, of a magnetic disk apparatus and FIG. 4B is a side elevational view, partly in section, of the magnetic disk apparatus of FIG. 4A. In the present embodiment, in order to restrict the amount of upward movement of the head slider 6 and the head suspension mechanism 8 in the thicknesswise direction of the disk, a displacement restriction member 36 is provided at a location of the inner side of the cover 20 of the housing in an opposing relationship to the CSS area on the inner side of the magnetic disk medium 2, and the L-shaped metal member 22 provided at the end of the gimbal of the head suspension mechanism 8 is positioned below the displacement restriction member 36 when the magnetic disk medium 2 stops.

When the L-shaped metal member 22 is positioned below the displacement restriction member 36, a small gap is defined between them. The displacement restriction member 36 restricts upward movement of the head slider 6 when the apparatus is acted upon by an acceleration due to an impact to a certain amount. If it is assumed that the head slider 6 is moved upwardly by h and the spring constant of the head suspension mechanism 8 is k, then the energy stored in the head suspension mechanism 8 is given by $kh^2/2$, and the head slider 6 collides with the magnetic disk medium 2 with this energy.

Accordingly, the energy upon collision can be reduced by restricting the upward movement amount h to a small amount by the provision of the displacement restriction member 36, and consequently, damage to the head slider 6 and the magnetic disk medium 2 can be prevented. It is to be noted that part of the displacement restriction member 36 may be formed from a dashpot element such as a sponge member, a spring element such as a leaf spring, or a member including a dashpot element and a spring element. Further, the displacement restriction member may be constructed so as to have a profile conforming to the locus of movement of the L-shaped metal member 22 in order to prevent upward movement of the head slider 6 irrespective of the position of the head slider 6.

Figure 5A:
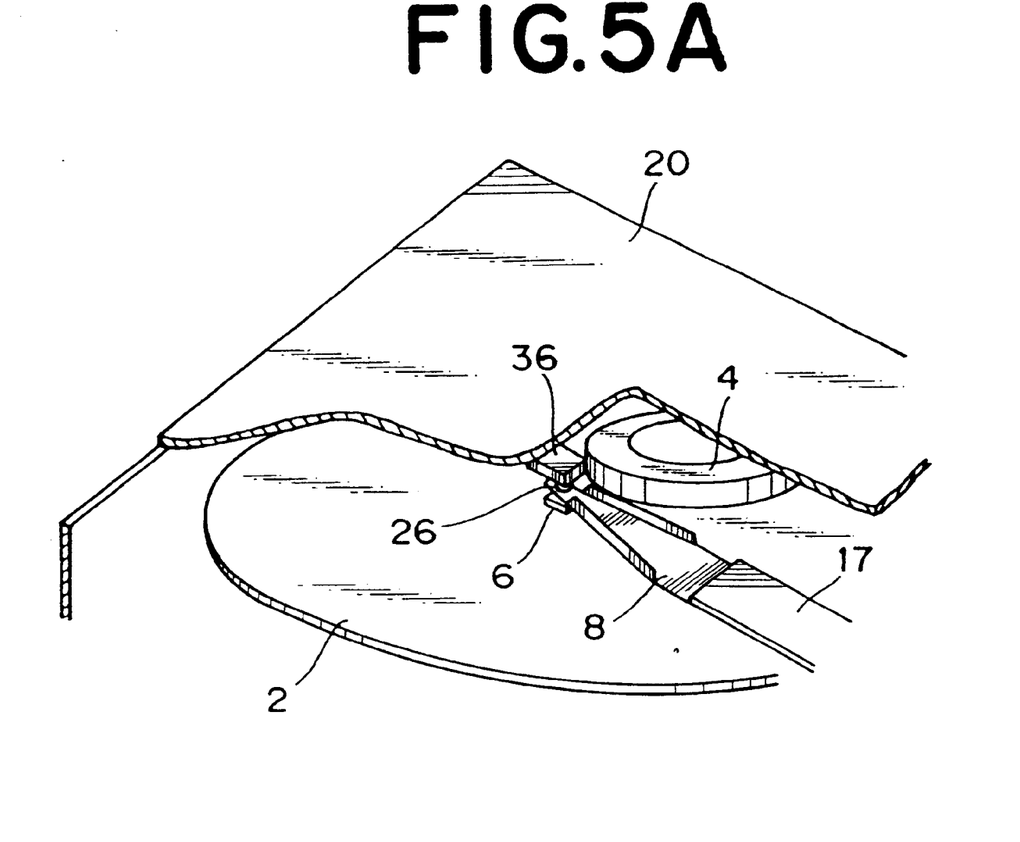
FIG. 5A is a perspective view, partly broken, of a magnetic disk apparatus of a fifth embodiment of the present invention.
Figure 5B:
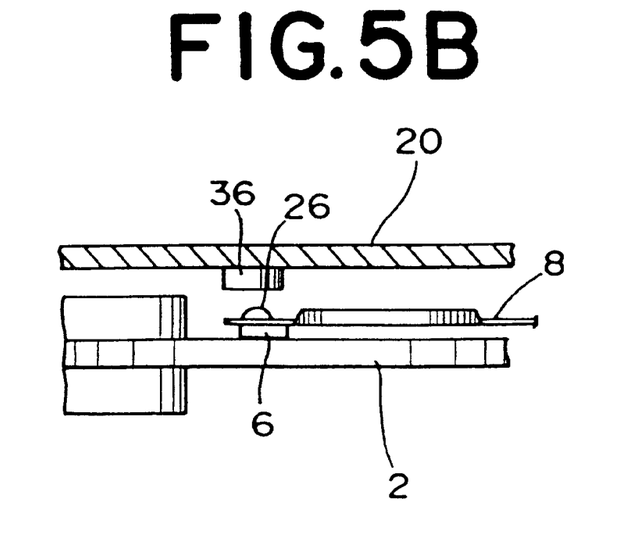
FIG. 5B is a side elevational view, partly in section, of the magnetic disk apparatus of FIG. 5A.

FIGS. 5A and 5B show a fifth embodiment of the present invention, and FIG. 5A is a perspective view, partly broken, of a magnetic disk apparatus and FIG. 5B is a side elevational view, partly in section, of the magnetic disk apparatus of FIG. 5A. In the present embodiment, similarly as in the second embodiment of FIGS. 2A and 2B, a projection 26 is provided at a location of the gimbal of the head suspension mechanism 8 corresponding to a central portion of the head slider 6 such that it may be positioned below the displacement restriction member 36 when the magnetic disk medium 2 stops. With the construction, since a portion of the head slider 6 in the proximity of the center can be held down, a burden is not applied to the head suspension mechanism 8, and consequently, damage to the head suspension mechanism 8 can be prevented.

Figure 6A:
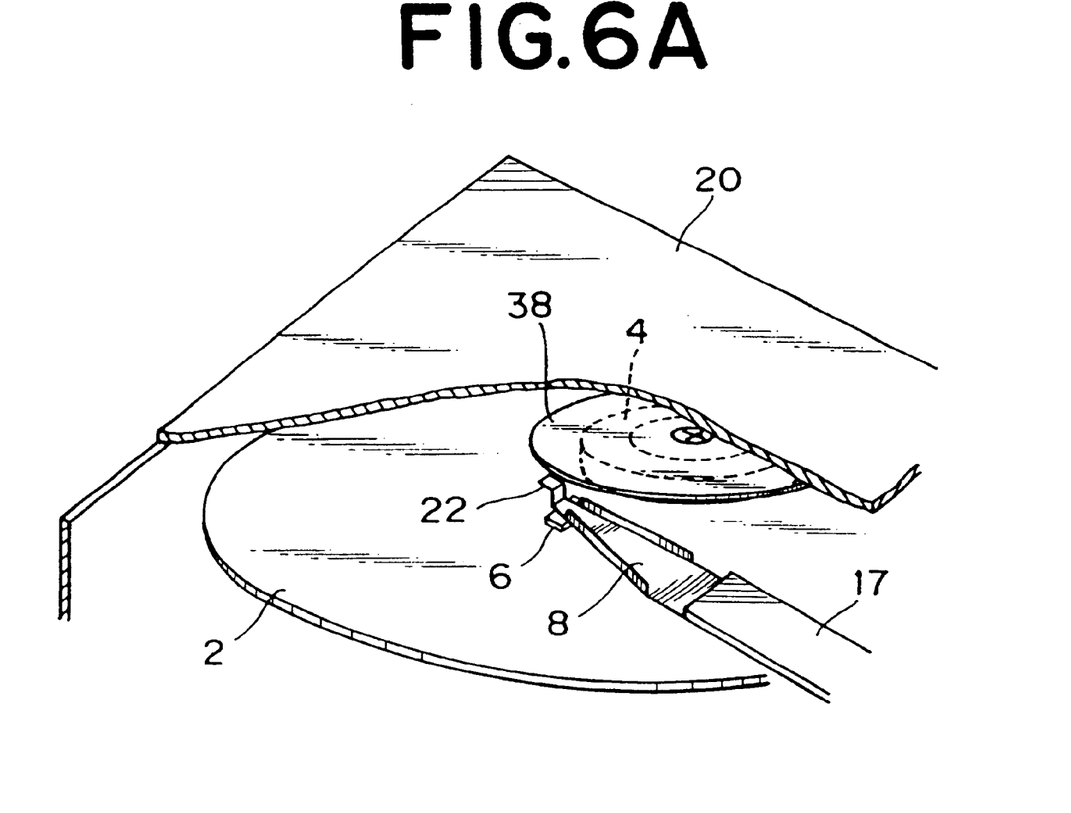
FIG. 6A is a perspective view, partly broken, of a magnetic disk apparatus of a sixth embodiment of the present invention.
Figure 6B:
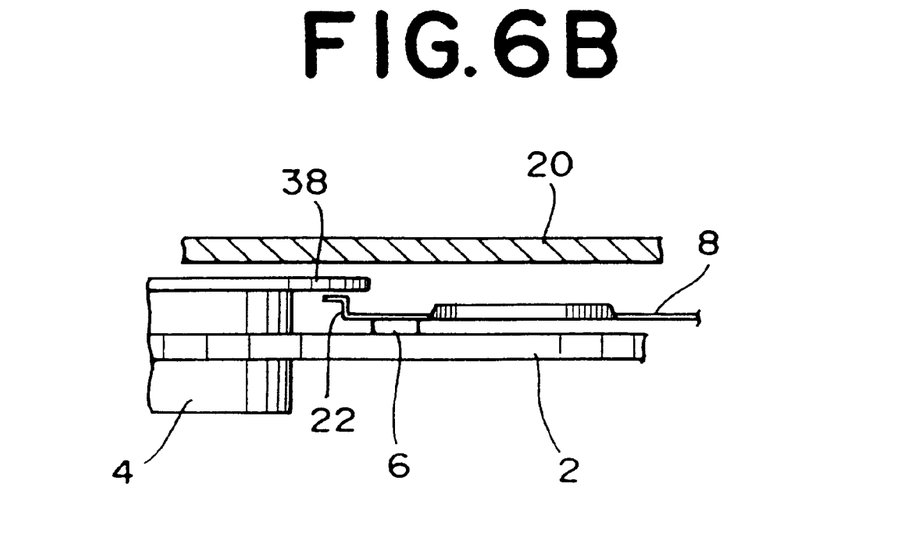
FIG. 6B is a side elevational view, partly in section, of the magnetic disk apparatus of FIG. 6A.

FIGS. 6A and 6B show a sixth embodiment of the present invention, and FIG. 6A is a perspective view, partly broken, of a magnetic disk apparatus and FIG. 6B is a side elevational view, partly in section, of the magnetic disk apparatus of FIG. 6A. In the present embodiment, a displacement restriction member 38 in the form of a disk is mounted on a movable portion (a hub, a disk clamper, a spacer ring or the like) of the spindle mechanism 4 (in the present embodiment, the displacement restriction member is formed integrally at an upper portion of the hub), and the L-shaped metal member 22 is provided at the end of the gimbal of the head suspension mechanism 8.

When the power supply to the apparatus is disconnected and the control of the actuator is stopped, the head slider 6 is automatically retracted to the CSS area on the inner side of the magnetic disk medium 2, that is, to a position below the displacement restriction member 38 by the automatic retraction mechanism. Consequently, damage to the head slider 6 and the magnetic disk medium 2 is prevented in a similar manner as in the preceding embodiments.

In the present embodiment, when compared with the case wherein the displacement restriction member is mounted on the inner side of the cover 20 as in the preceding embodiments, the settlement accuracy of the position of the displacement restriction member 38 from the plane of the magnetic disk medium can be enhanced. Consequently, the distance between the lower face of the displacement restriction member 38 and the upper face of the end of the L-shaped metal member 22 can be set to a low value of approximately 200 μm or less, and upward movement of the head slider 6 can be restricted effectively.

Figure 7A:
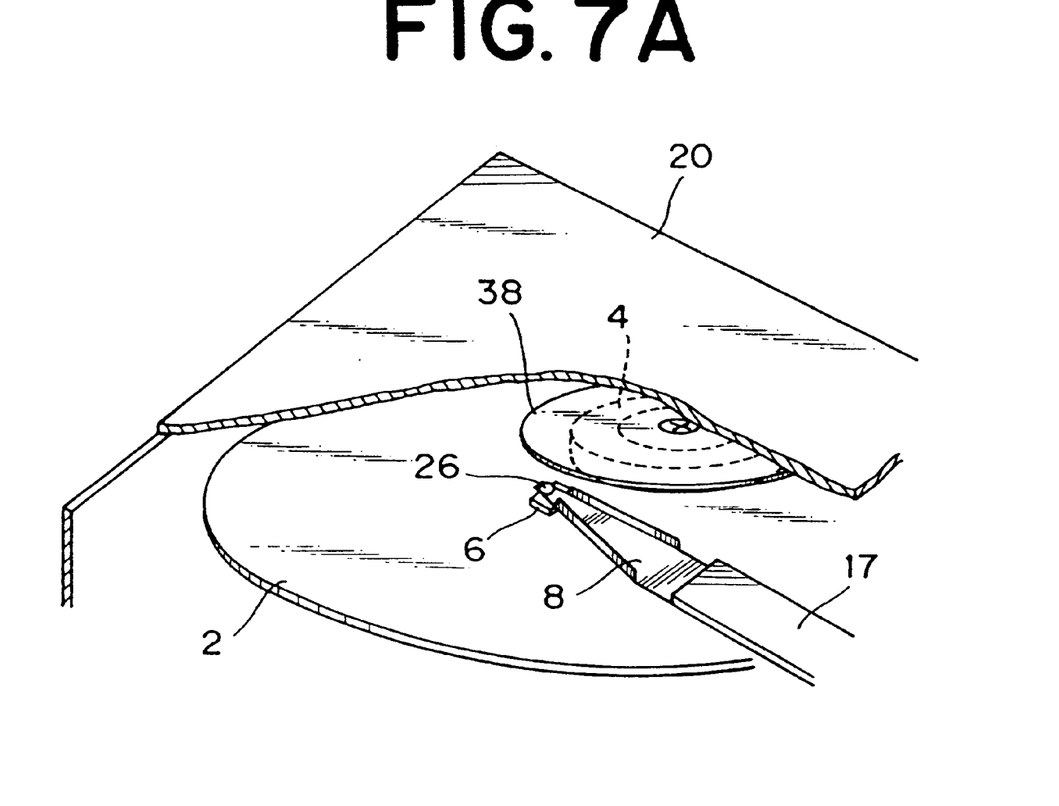
FIG. 7A is a perspective view, partly broken, of a magnetic disk apparatus of a seventh embodiment of the present invention.
Figure 7B:
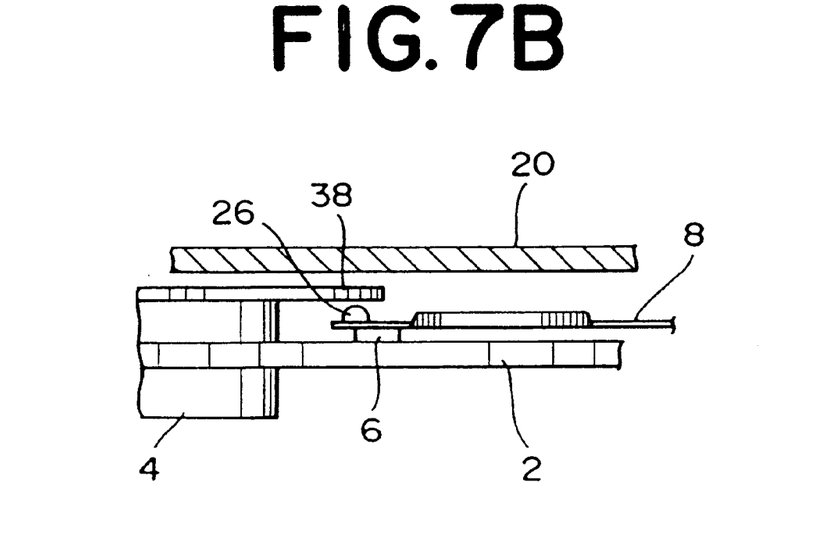
FIG. 7B is a side elevational view, partly in section, of the magnetic disk apparatus of FIG. 7A.

FIGS. 7A and 7B show a seventh embodiment of the present invention, and FIG. 7A is a perspective view, partly broken, of a magnetic disk apparatus and FIG. 7B is a side elevational view, partly in section, of the magnetic disk apparatus of FIG. 7A. The present embodiment is characterized in that the L-shaped metal member 22 in the sixth embodiment is replaced by a projection 26 provided at a location of the gimbal of the head suspension mechanism 8 corresponding to a central portion of the slider in a similar manner as in the second embodiment of FIGS. 2A and 2B. Due to the construction, in addition to the effects of the preceding embodiment, since a portion of the head slider 6 in the proximity of the center can be held down, a further effect can be achieved in that a burden is applied less likely to the head suspension mechanism 8 and damage to the head suspension mechanism 8 can be prevented.

Figure 8A:
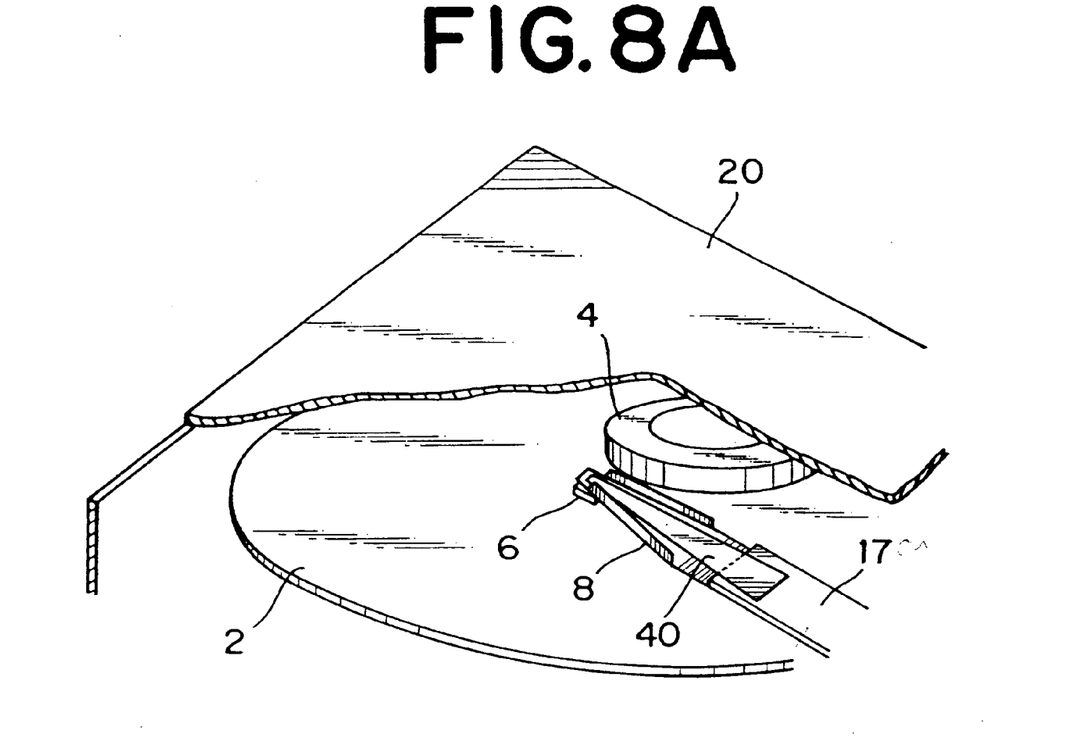
FIG. 8A is a perspective view, partly broken, of a magnetic disk apparatus of an eighth embodiment of the present invention.
Figure 8B:
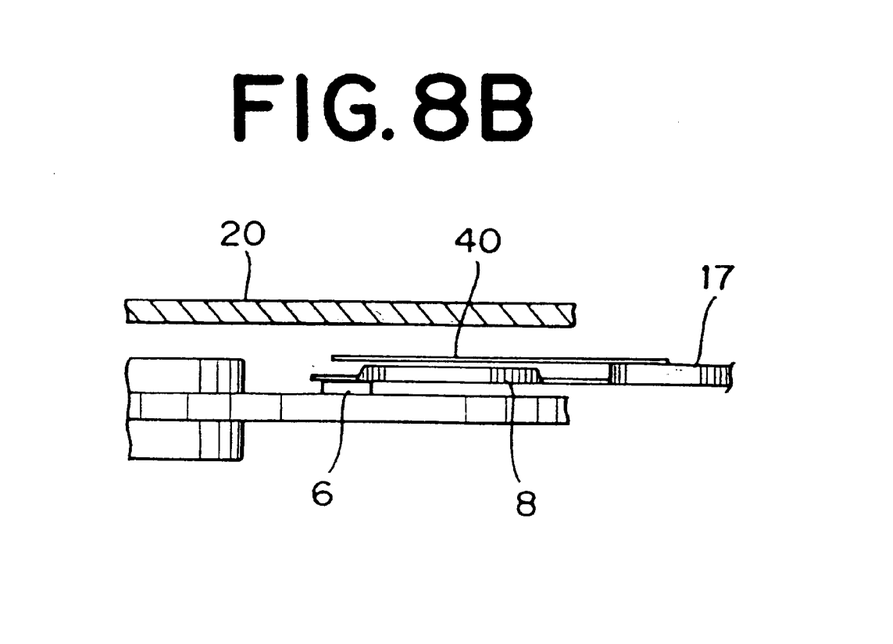
FIG. 8B is a side elevational view, partly in section, of the magnetic disk apparatus of FIG. 8A.

FIGS. 8A and 8B show an eighth embodiment of the present invention, and FIG. 8A is a perspective view, partly broken, of a magnetic disk apparatus and FIG. 8B is a side elevational view, partly in section, of the magnetic disk apparatus of FIG. 8A. In the present embodiment, a displacement restriction member 40 is mounted at an end of a support arm 17 of the actuator 10. Also with the present construction, since the displacement restriction member 40 functions similarly as in the fourth to seventh embodiments, damage to the head slider 6 and the magnetic disk medium 2 can be prevented. Further, in the present embodiment, since the displacement restriction member 40 is always positioned above the head slider 6, upward movement of the head slider 6 can be suppressed whichever position the head slider 6 is positioned whether the automatic retraction mechanism is adopted or not.

Figure 9A:
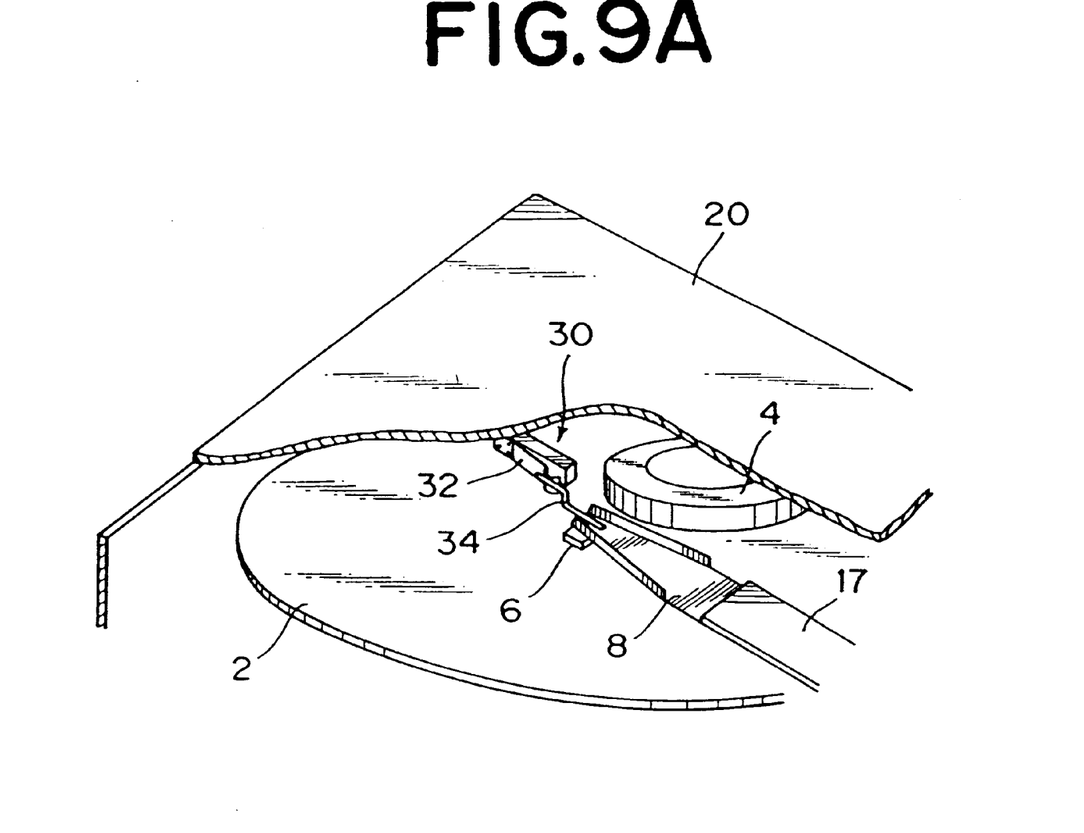
FIG. 9A is a perspective view, partly broken, of a magnetic disk apparatus of a ninth embodiment of the present invention.
Figure 9B:
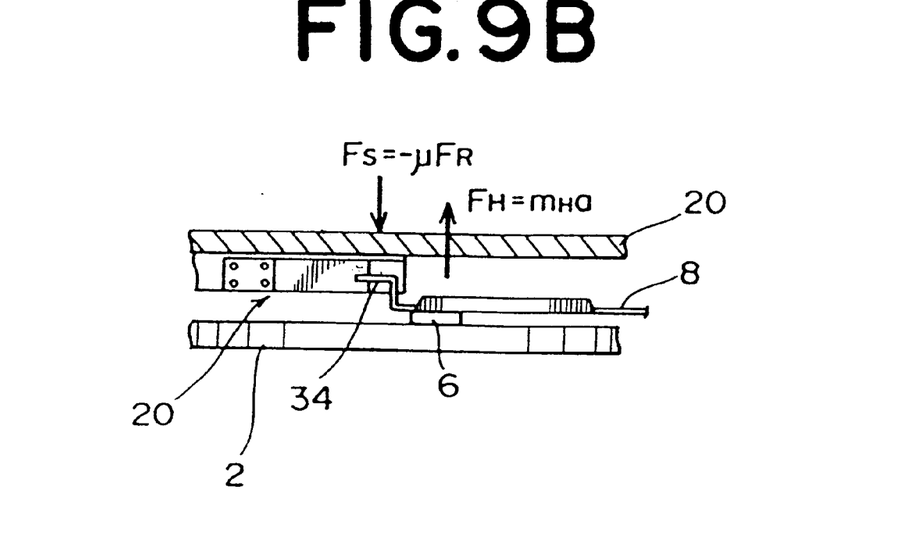
FIG. 9B is a side elevational view, partly in section, of the magnetic disk apparatus of FIG. 9A.

FIGS. 9A and 9B show a ninth embodiment of the present invention, and FIG. 9A is a perspective view, partly broken, of a magnetic disk apparatus and FIG. 9B is a side elevational view, partly in section, of the magnetic disk apparatus of FIG. 9A. In the present embodiment, the load mechanism 24 of FIGS. 1A and 1B is replaced by a displacement attenuation leaf spring mechanism 30 provided on the inner side of the cover 20. The mechanism 30 includes a leaf spring 32 which is flexible in a direction in a plane parallel to the magnetic disk medium 2 but is rigid in a direction perpendicular to the plane. A resin member not shown is mounted on the surface at a portion of the leaf spring 32 in order to increase the coefficient $\mu$ of friction of the surface. Further, a needle (arresting member) 34 is provided at the end of the load beam of the head suspension mechanism 8 in place of the L-shaped metal member 22 of FIGS. 1A and 1B.

The principle of operation in the present embodiment will be described. When the power supply to the apparatus is disconnected and the control of the actuator is interrupted, the automatic retraction mechanism operates to retract the head slider 6 to the CSS area on the inner side of the magnetic disk medium 2. In this instance, the needle 34 mounted at the end of the load beam of the head suspension mechanism 8 is pressed against the leaf spring 32 of the displacement attenuation leaf spring mechanism 30. Here, if it is assumed that the apparatus is acted upon by an impact by a drop or the like and the acceleration to the magnetic disk medium 2 in the vertical direction is represented by "a" while the mass of the head slider 6 and the head suspension mechanism 8 is represented by $m_H$, then the inertial force $F_H$ acting upon the head suspension mechanism 8 in the vertical direction is given by $F_H = m_H a$.

Here, the head suspension mechanism 8 is kept pressed against the leaf spring 32 from an inward direction in a seeking plane (in a direction in a plane parallel to the magnetic disk medium 2) under the force of $F_R$ by the automatic retraction mechanism. The leaf spring 32 exerts a holding or resisting force of $-\mu F_R$ to the head suspension mechanism 8 which tends to move with the inertial force of $F_H$. Accordingly, the total force $F_T$ acting upon the head suspension mechanism 8 in the vertical direction is given by $F_T = m_H a - \mu F_R$. Further, when the head suspension mechanism 8 and the displacement attenuation leaf spring mechanism 30 are displaced from each other, energy is lost by friction between them. Consequently, the upward movement of the head slider 6 is reduced and the energy when the head slider 6 collides with the magnetic disk medium 2 is reduced. Consequently, damage to the head slider 6 and the magnetic disk medium 2 is prevented.

It is to be noted that, while the magnetic disk apparatus of the embodiments described above are constructed such that the head slider is retracted to the CSS area on the inner side of the magnetic disk medium, the CSS area to which the head slider is retraced may be provided on the outer side of the magnetic disk medium. Further, the present invention can be applied to a disk apparatus wherein a magnetic disk can be stopped while the power supply to the apparatus is on.

As described above, according to the present invention, a meritorious effect that a magnetic disk apparatus wherein a head slider and a magnetic disk medium can be protected from an impact upon dropping of the apparatus without employing a loading/unloading mechanism is provided.

What is claimed is:

1. A magnetic disk apparatus, comprising:

a housing;

a magnetic disk medium accommodated for rotation in said housing;

spindle means for driving said magnetic disk medium to rotate;

a magnetic head for writing and reading out information onto and from said magnetic disk medium;

head suspension means for supporting said magnetic head thereon;

actuator means for driving said head suspension means to move said magnetic head in a radial direction of said magnetic disk medium;

retraction means for retracting said magnetic head to a particular area on said magnetic disk medium when said spindle means is rendered inoperative; and means provided at a location above said magnetic disk medium in an opposing relationship to said particular area of said magnetic disk medium for pressing at least one of said magnetic head and said head suspension means against said magnetic disk medium.

2. A magnetic disk apparatus according to claim 1, wherein said pressing means includes an L-shaped member secured to an end of said head suspension means, and a load mechanism mounted on said housing for pressing said L-shaped member.

3. A magnetic disk apparatus according to claim 1, wherein said pressing means includes a projection provided on said head suspension means, and a load mechanism mounted on said housing for pressing said projection.

4. A magnetic disk apparatus, comprising:

a housing;

a magnetic disk medium adapted for rotation in said housing;

spindle means for rotating said magnetic disk medium;

a magnetic head for writing and reading out information onto and from said magnetic disk medium;

head suspension means for supporting said magnetic head thereon;

actuator means for driving said head suspension means to move said magnetic head in a radial direction with respect to said magnetic disk medium;

retraction means for retracting said magnetic head to a particular area on said magnetic disk medium when said spindle means is rendered inoperative; and displacement restriction means for limiting vertical displacement of said head when an external force is applied to said magnetic disk, said displacement restriction means including a displacement restriction member mounted on an inner side of said housing, said displacement restriction means being provided at a location above said magnetic disk medium in an opposing relationship to said particular area of said magnetic disk medium, said displacement restriction means defining a small gap between said displacement restriction member and at least one of said magnetic head and said head suspension means, said gap being less than approximately 200 $\mu$m.

5. A magnetic disk apparatus according to claim 4, wherein said displacement restriction means includes an L-shaped member secured to an end of said head suspension means, and said displacement restriction member mounted on said housing, said L-shaped member and said displacement restriction member defining a small gap therebetween.

6. A magnetic disk apparatus according to claim 4, wherein said displacement restriction means includes a projection provided on said head suspension means, and said displacement restriction member mounted on said housing, said projection and said displacement restriction member defining a small gap therebetween.

7. A magnetic disk apparatus, comprising:

a housing;

a magnetic disk medium adapted for rotation in said housing;

spindle means for rotating said magnetic disk medium;

a magnetic head for writing and reading out information onto and from said magnetic disk medium;

head suspension means for supporting said magnetic head thereon;

actuator means for driving said head suspension means to move said magnetic head in a radial direction with respect to said magnetic disk medium, said actuator means including an arm to which said head suspension means is secured, said arm being rotatably mounted to said housing; and a displacement restriction member secured to said arm and extending to a distal end of said head suspension means for restricting vertical displacement of said magnetic head toward said housing when an external force is applied to said magnetic disk apparatus, said displacement restriction member and said magnetic head cooperatively defining a small gap therebetween in an operating state in which said magnetic head is floating over said magnetic disk medium and is capable of writing and reading information onto/from said magnetic disk medium.

8. A magnetic disk apparatus, comprising:

a housing;

a magnetic disk medium adapted for rotation in said housing;

spindle means for rotating said magnetic disk medium;

a magnetic head for writing and reading out information onto and from said magnetic disk medium;

head suspension means for supporting said magnetic head thereon;

actuator means for driving said head suspension means to move said magnetic head in a radial direction to said magnetic disk medium;

retraction means for retracting said magnetic head to a particular area on said magnetic disk medium when said spindle means is rendered inoperative;

an arresting member secured to a distal end of said head suspension means around a position at which said magnetic head is mounted on said head suspension means; and a displacement restriction member provided at a location above said magnetic disk medium in an opposing relationship to said particular area of said magnetic disk medium, said displacement restriction member being made of a material which is flexible in a direction in a plane of a seeking direction of said magnetic head but is rigid in a direction perpendicular to said plane;

wherein when said magnetic disk medium stops rotating said displacement restriction member and said arresting member contact each other to prevent said magnetic head from moving away from a face of said magnetic disk medium.

* * * * *